(12) United States Patent
Jung et al.

(10) Patent No.: US 10,719,147 B2
(45) Date of Patent: Jul. 21, 2020

(54) DISPLAY APPARATUS AND CONTROL METHOD THEREOF

(71) Applicant: SAMSUNG ELECTRONICS CO., LTD., Suwon-si (KR)

(72) Inventors: Jae-won Jung, Seoul (KR); Yong-deok Kim, Anyang-si (KR); Hyun-kyu Yun, Seoul (KR); Byuk-sun Kim, Seoul (KR); Sang-hoon Eum, Seoul (KR); Myoung-jun Lee, Suwon-si (KR); Byung-jo Jun, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 452 days.

(21) Appl. No.: 15/010,077

(22) Filed: Jan. 29, 2016

(65) Prior Publication Data

US 2016/0224134 A1 Aug. 4, 2016

(30) Foreign Application Priority Data

Jan. 29, 2015 (KR) .......................... 10-2015-0014133

(51) Int. Cl.
*G06F 3/033* (2013.01)
*G06F 3/048* (2013.01)
(Continued)

(52) U.S. Cl.
CPC ............ *G06F 3/0383* (2013.01); *G06F 3/017* (2013.01); *G06F 3/033* (2013.01); *G06F 3/0346* (2013.01);
(Continued)

(58) Field of Classification Search
CPC ........ G06F 3/0383; G06F 3/033; G06F 3/017; G06F 3/0346; G06F 2200/1637; G08C 17/02; G08C 2201/32
See application file for complete search history.

(56) References Cited

U.S. PATENT DOCUMENTS 8,560,012 B2 10/2013 Ohnishi et al.
8,878,775 B2 11/2014 Cho et al.
(Continued)

FOREIGN PATENT DOCUMENTS

CN 102301738 A 12/2011
CN 103218059 A 7/2013
(Continued)

OTHER PUBLICATIONS

Communication dated May 27, 2016, issued by the European Patent Office in counterpart European Application No. 15197776.6.
(Continued)

*Primary Examiner* — Antonio Xavier
(74) *Attorney, Agent, or Firm* — Sughrue Mion, PLLC

(57) ABSTRACT

A display apparatus including a display configured to display a pointing object, a communicator configured to perform communication with a remote control device which recognizes a movement and transmits a signal corresponding to the recognized movement, and a processor configured to control a moving state of the pointing object based on the signal received from the remote control device. The processor controls the moving state of the pointing object according to a relative coordinate method for a first area where a screen of the display is included, and controls the moving state of the pointing object according to an absolute coordinate method for a second area outside the first area.

18 Claims, 14 Drawing Sheets

(51) Int. Cl.
*G06F 3/038* (2013.01)
*G08C 17/02* (2006.01)
*G06F 3/01* (2006.01)
*G06F 3/0346* (2013.01)

(52) U.S. Cl.
CPC ...... *G08C 17/02* (2013.01); *G06F 2200/1637* (2013.01); *G08C 2201/32* (2013.01)

(56) References Cited

U.S. PATENT DOCUMENTS

| | | | |
|---|---|---|---|
| RE46,108 E | 8/2016 | Ohnishi et al. | |
| 9,958,962 B2* | 5/2018 | Grenet | G06F 3/0346 |
| 10,386,987 B2* | 8/2019 | Choi | G06F 3/0485 |
| 2005/0001848 A1* | 1/2005 | Colavin | G09G 5/34 |
| | | | 345/566 |
| 2006/0139327 A1 | 6/2006 | Dawson et al. | |
| 2011/0169734 A1 | 7/2011 | Cho et al. | |
| 2012/0019674 A1 | 1/2012 | Ohnishi et al. | |
| 2012/0242907 A1 | 9/2012 | Lai et al. | |
| 2013/0132912 A1 | 5/2013 | Kim et al. | |
| 2013/0314396 A1 | 11/2013 | Kang et al. | |
| 2014/0092011 A1* | 4/2014 | De Foras | G06F 3/0346 |
| | | | 345/157 |

FOREIGN PATENT DOCUMENTS

| | | |
|---|---|---|
| EP | 1764141 A1 | 3/2007 |
| EP | 2428875 A2 | 3/2012 |
| EP | 2677741 A1 | 12/2013 |
| KR | 10-2011-0082664 A | 7/2011 |
| KR | 10-2014-0002911 A | 1/2014 |
| WO | 2014/123669 A1 | 8/2014 |

OTHER PUBLICATIONS

Communication dated Jun. 24, 2016, issued by the International Searching Authority in counterpart International Application No. PCT/KR2016/000573 (PCT/ISA/210 & PCT/ISA/237).

Communication dated Jul. 1, 2019 issued by the State Intellectual Property Office of P.R. China in counterpart Chinese Application No. 201680005508.8.

Communication dated Dec. 27, 2019, from the State Intellectual Property Office of People's Republic of China in counterpart Application No. 201680005508.8.

* cited by examiner

DISPLAY APPARATUS AND CONTROL METHOD THEREOF

CROSS-REFERENCE TO RELATED APPLICATIONS

This application claims priority from Korean Patent Application No. 10-2015-0014133, filed on Jan. 29, 2015 in the Korean Intellectual Property Office, the disclosure of which is incorporated herein by reference in its entirety.

BACKGROUND

1. Field

Apparatuses and methods consistent with exemplary embodiments relate to a display apparatus and a control method thereof to display a pointer that can be controlled by a remote control device.

2. Description of the Related Art

As electronic apparatuses continue to be developed, new ways of controlling an electronic apparatuses are also being developed. Exemplary embodiments relate to controlling an electronic apparatus by using buttons provided on the electronic apparatus or a remote controller, which is a device separate from the electronic apparatus.

When the electronic apparatus is controlled by using the separate remote controller, a user may be hindered by being required to press the buttons on the remote controller multiple times to perform a requested operation.

For example, when a pointer displayed on the screen is used in order to select specific content on the electronic apparatus' screen, a user has to manipulate the directional buttons of the remote controller multiple times to move the pointer to the corresponding content area, and then select the specific content by pressing a select button provided on the remote controller. Thus, a user must manipulate the buttons of the remote controller multiple times in order to select the desired content.

Accordingly, a method is provided, with which a user can more conveniently search the information displayed on the screen of the electronic apparatus.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

Aspects of one or more exemplary embodiments provide a method of controlling a display apparatus.

According to an aspect of an exemplary embodiment, there is provided a display apparatus, including: a display configured to display a pointing object; a communicator configured to perform communication with a remote control device, the remote control device configured to recognize a movement and transmit a signal corresponding to the recognized movement to the communicator; and a processor configured to control a moving state of the pointing object based on the signal transmitted from the remote control device, wherein the processor controls the moving state of the pointing object according to a relative coordinate method for a first area where a screen of the display is included, and controls the moving state of the pointing object according to an absolute coordinate method for a second area outside the first area.

The apparatus may further include wherein the first area comprises the screen of the display and a margin area outside the screen.

The apparatus may further include wherein, when vector signals corresponding to a magnitude and a direction of the remote control device are received from the remote control device, the processor calculates a moving trajectory of the remote control device by summing the received vector signals and determines whether the remote control device belongs to the first area or the second area based on the calculated moving trajectory.

The apparatus may further include wherein, when a trigger signal for establishing a standard position on the screen is received from the remote control device, the processor displays the pointing object on the standard position and generates a virtual absolute coordinate system based on the standard position in which the pointing object is displayed.

The apparatus may further include wherein, when a signal corresponding to a magnitude and a direction of the movement regarding the remote control device is transmitted from the remote control device, the processor moves the pointing object to a position corresponding to the magnitude and the direction of the movement regarding the first area, and moves the pointing object to the position corresponding to a direction as directed by the remote control device on the virtual absolute coordinate system regarding the second area.

The apparatus may further include wherein: when the remote control device is positioned within the first area, the processor controls the moving state by accelerating and decelerating the pointing object based on the transmitted signal, and when the remote control device is positioned within the second area, moves the pointing object to the coordinate value corresponding to a direction as directed by the remote control device on the virtual absolute coordinate system without accelerating and decelerating the moving speed of the pointing object.

The apparatus may further include, wherein: when the remote control device is determined to have entered from the screen area into the margin area, the processor controls the moving state of the pointing object according to the relative coordinate method, and when the remote control device is determined to have entered from the second area into the margin area, the processor controls the moving state of the pointing object according to the absolute coordinate method.

The apparatus may further include wherein, when the remote control device is determined to have entered into the second area while the moving state of the pointing object is controlled according to the relative coordinate method on the first area, the processor controls movement of the pointing object such that the pointing object is moved to one border area of the screen according to the direction in which the remote control device moves.

The apparatus may further include wherein, when the remote control device moves within the second area, the processor is configured so that at least one of the x and the y coordinate values of the pointing object is fixed and displayed according to the absolute coordinate method.

The apparatus may further include wherein, when the remote control device is determined to have entered from the second area into the margin area of the first area, the processor controls so that at least one of an x and an y coordinate value regarding the pointing object is fixed and displayed according to the absolute coordinate method, and when the remote control device is determined to have entered from the margin area into the screen area of the display, the processor is configured so that the position of the pointing object is moved and displayed according to the relative coordinate method.

The display apparatus may further include wherein the transmitted signal from the remote control device is from at least one of an acceleration sensor, a geomagnetic sensor, and a gyro sensor.

Embodiments of the apparatus may include wherein the pointing object moves corresponding to the recognized movement of the communicator in the relative coordinate method, and wherein the pointing object is stationary in at least one axis in the absolute coordinate method.

According to an aspect of another exemplary embodiment, there is provided a control method of a display apparatus, comprising: receiving a signal corresponding to a movement of a remote control device; and controlling a moving state of a pointing object based on the signal received from the remote control device, wherein the moving state of the pointing object is controlled according to a relative coordinate method for a first area comprising a screen area of a display, and the moving state of the pointing object is controlled according to the absolute coordinate method for a second area outside the first area.

The method may further include wherein the first area comprises the screen of the display and a margin area outside the screen.

The method may further include wherein, when vector signals corresponding to a magnitude and a direction of the remote control device are received from the remote control device, the control method further comprises calculating a moving trajectory of the remote control device by summing the received vector signals and determining whether the remote control device belongs to the first area or the second area based on the calculated moving trajectory.

The method may further include displaying the pointing object on a standard position and generating a virtual absolute coordinate system based on the standard position in which the pointing object is displayed, when a trigger signal for establishing the standard position on the screen is received from the remote control device.

The method may further include wherein the controlling the moving state of the pointing object comprises moving the pointing object to a position corresponding to a magnitude and a direction of the movement regarding the first area, and moving the pointing object to a position corresponding to a direction as directed by the remote control device on the virtual absolute coordinate system regarding the second area.

The method may further include wherein the controlling the moving state of the pointing object comprises: controlling the moving state by accelerating and decelerating a moving speed of the pointing object based on the received signal, when the remote control device is positioned within the first area, and moving the pointing object to the coordinate value corresponding to a direction as directed by the remote control device on the virtual absolute coordinate system without accelerating and decelerating the moving speed of the pointing object, when the remote control device is positioned within the second area.

The method may further include wherein the controlling the moving state of the pointing object comprises: controlling the moving state of the pointing object according to the relative coordinate method, when the remote control device is determined to have entered from the screen area into a margin area, and controlling the moving state of the pointing object according to the absolute coordinate method, when the remote control device is determined to have entered from the second area into the margin area.

The method may further include wherein the controlling the moving state of the pointing object comprises: moving the pointing object on one border area of the screen according to the direction in which the remote control device moves, when the remote control device is determined to have entered into the second area while the moving state of the pointing object is controlled according to the relative coordinate method on the first area.

The method may further include wherein the controlling the moving state of the pointing object comprises: fixing at least one of a x and a y coordinate value of the pointing object according to the absolute coordinate method, when the remote control device moves within the second area.

The method may further include wherein the controlling the moving state of the pointing object comprises: fixing at least one of the x and the y coordinate value regarding the pointing object according to the absolute coordinate method, when the remote control device is determined to have entered from the second area into the margin area of the first area, and moving and displaying the position of the pointing object according to the relative coordinate method when the remote control device is determined to have entered from the margin area into the screen area of the display.

One or more exemplary embodiments may provide for a display apparatus, including a display screen configured to display a pointing object, a communicator configured to communicate with a remote control device, the remote control device configured to detect a movement of the remote control device and transmit a signal corresponding to the movement to the communicator, and a processor configured to control movement of the displayed pointing object based on the transmitted signal. Embodiments may provide wherein the pointing object moves in directions corresponding to directions of movement of the remote control device when the processor determines that the transmitted signal indicates that the pointing object is moved on the display screen or on a margin area surrounding the display screen, and wherein the pointing object is stationary in at least one axis when the processor determines that the transmitted signal indicates a movement of the pointing object to be outside of the margin area.

Exemplary embodiments may provide for wherein the margin area at least overlaps a bezel of the display apparatus.

Exemplary embodiments may provide for wherein the pointing object is initially displayed at a predetermined location on the display screen in response to a trigger signal received by the display apparatus, wherein the movement of the pointing object is determined based on the movement of the remote control device relative to an initial position of the remote control device when the trigger signal is received by the display apparatus.

Exemplary embodiments may provide for wherein the margin area at least overlaps an outer housing of the display apparatus.

Exemplary embodiments may provide for wherein the margin area is from edges of a visible area of the display screen to at least one predetermined distance outward from the visible area of the display screen.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Reference will now be made in detail to exemplary embodiments, examples of which are illustrated in the accompanying drawings. In this regard, the present exemplary embodiments may have different forms and should not be construed as being limited to the descriptions set forth herein. In the following description, well-known functions or constructions are not described in detail so as not to obscure the embodiments with unnecessary detail.

The terms "first", "second", etc. may be used to describe multiple components, but the components are not limited by the terms. The terms are only used to distinguish one component from the others.

The terms used in the present application are used to describe the exemplary embodiments, but are not intended to limit the scope of the disclosure. In some contexts, singular expressions also include a plurality. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

In the exemplary embodiment of the present disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown) and/or a non-transitory compute readable storage medium.

Figure 1:
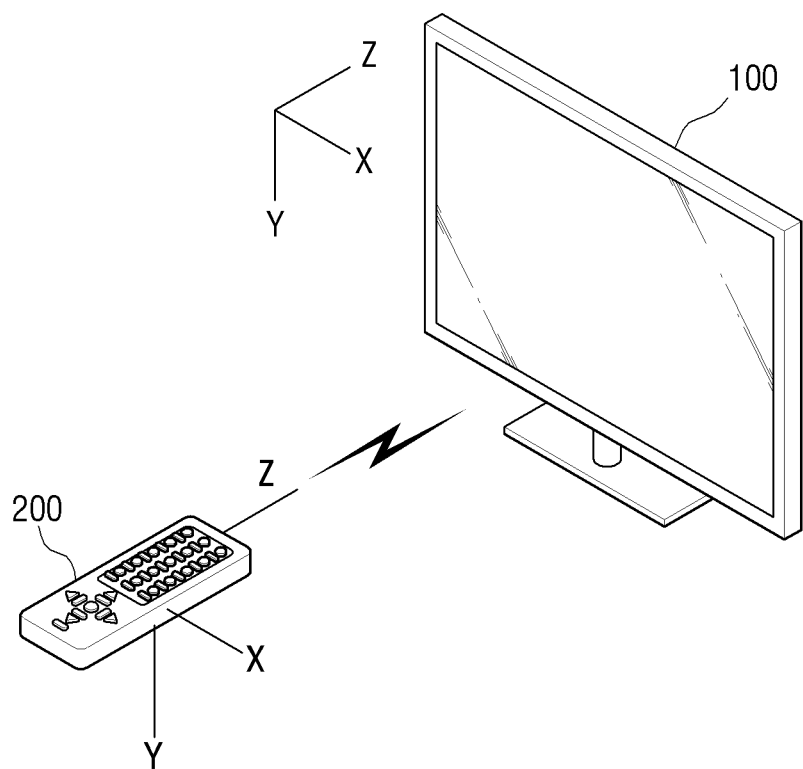
FIG. 1 is a diagram illustrating a display system according to an exemplary embodiment.

Hereinafter, the present disclosure will be described in detail with reference to the accompanying drawings. FIG. 1 is a diagram illustrating a display system according to an embodiment.

Referring to FIG. 1, the display system according to an exemplary embodiment includes a display apparatus 100 and a remote control device 200.

The display apparatus 100 may be a digital TV that can be controlled with the remote control device 200, but it is not limited as such. Accordingly, any device that can be remote-controlled, such as personal computer (PC), may be understood as the display apparatus.

The remote control device 200 is a device to control the display apparatus 100 remotely. The remote control device 200 may receive a user command and transmit the signal corresponding to the inputted user command to the display apparatus 100.

Specifically, the remote control device 200 may be implemented as a 3D pointing device which senses three dimensional movement of the remote control device 200 relative to a coordinate system, such as a Cartesian coordinate system as show by XYZ dimensions. The remote control device transmits a signal regarding the sensed three dimensional movement to the display apparatus 100. Herein, the three dimensional movement ("movement") may correspond to a command for controlling the display apparatus 100. Thus, a user may deliver a certain command to the display apparatus 100 by moving the remote control device 200. In some embodiments, the remote control device 200 may transmit the movement information corresponding to the sensed movement. In some embodiments, the remote control device 200 may convert and transmit the movement information corresponding to the sensed movement into a control signal to control the display apparatus 100.

Meanwhile, the display apparatus 100 may control the moving state of a pointing object (e.g., cursor or pointer) displayed on a user interface screen (hereinbelow, "UI") provided through the display apparatus 100 according to the movement of the remote control device 200.

Specifically, the display apparatus 100 may operate using a combination of a relative coordinate method, which controls the moving state of the pointing object based on a moving amount of the remote control device 200 only, and an absolute coordinate method, which controls the moving state of the pointing object based on an absolute coordinate system from the standard point. Alternatively, only a singular method may be used. The following will explain an embodiment more specifically by referring to drawings.

Figure 2:
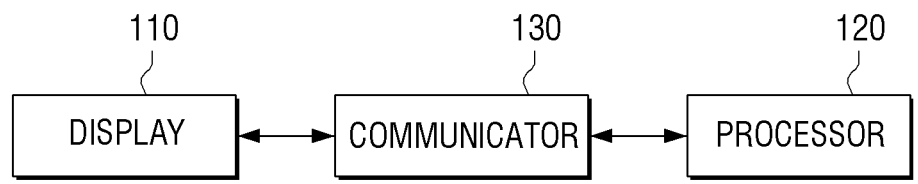
FIG. 2 is a block diagram illustrating a display apparatus according to an exemplary embodiment.

FIG. 2 is a block diagram illustrating a display apparatus according to an embodiment.

The display apparatus includes a display 110, a communicator 120, and a processor 130.

The display 110 may provide content on its screen, including various content screens. The content may include or relate to s images, video, text, music, application implementing screens including the various contents, and Graphic User Interface (GUI) screens.

Meanwhile, the display 110 may be one of a variety of technologies, such as, but not limited to, liquid crystal display (LCD), organic light emitting diode (OLED), liquid crystal on silicon (LCoS), and digital light processing (DLP).

The communicator 120 may perform communication with the remote control device 200. Herein, the communicator 120 may perform the communication with the remote control device 200 according to at least one of various communication methods such as Bluetooth (BT), Wireless Fidelity (WI-FI), Zigbee, Infrared (IR), Serial Interface, Universal Serial Bus (USB), and Near Field Communication (NFC).

Specifically, when a preset event occurs, the communicator 120 may operate in an interoperation state by performing the communication with the remote control device 200 according to a predefined communication method. Herein, the "interoperation" may indicate every state in which the communication is available, including, for example, operation to initialize the communication between the display apparatus 100 and the remote control device 200, operation to form the network, operation to perform the device pairing, and so on. For example, device identification information of the remote control device 200 may be provided to the display apparatus 100 for the pairing between the two devices to be performed. In an exemplary embodiment, when a preset event occurs in the display apparatus 100 or the remote control device 200, the interoperation state may be implemented by searching surrounded devices and performing the pairing with the searched device through Digital Living Network Alliance (DLNA).

Specifically, the communicator 120 may receive the signal corresponding to the movement of the remote control device 200 from the remote control device 200.

The processor 130 may control general operation of the display apparatus 100.

The processor 130 may display the pointing object on the screen according to a preset event, and control a moving state of the pointing object based on the received signal from the remote control device 200. Herein, the remote control device 200 may be implemented to recognize the movement and transmit the signal corresponding to the recognized movement to the display apparatus 100, as described above.

For the above, when a trigger signal for establishing a standard position on the screen is received from the remote control device 200, the processor 130 may display the pointing object on the pre-established standard position of the screen. Herein, the pre-established standard position may be a screen center area, but it is not limited thereto. In some embodiments, the pre-established standard position may be an area within the screen such as a certain point in a corner area or an edge area of the screen. The pre-established standard position may be set to be defaulted when being manufactured or implemented as set by a user.

In some embodiments, when the trigger signal is received from the remote control device 200, the processor 130 may generate a virtual absolute coordinate system based on the preset standard position, e.g., the displayed position of the corresponding pointing object when the pointing object is displayed on the screen center area.

In some embodiments, when the trigger signal is received from the remote control device 200, the processor 130 may generate the virtual absolute coordinate system based on a voluntary position coordinate value where the pointing object is displayed. Thus, the displayed position of the pointing object may be different according to cases at the time when the trigger signal is received, and the processor 130 may generate the virtual absolute coordinate system based on the voluntary position coordinate value where the pointing object is displayed.

The trigger signal may be received according to a preset manipulation of the remote control device 200 (e.g., manipulation to push the centering button). However, it may not be limited to herein; the trigger signal may be received according to various events that may occur for the using of the remote control device 200 such as turning on the power button.

When the pointing object is initially displayed at a predetermined location on the display 110 in response to a trigger signal received by the display apparatus 100, the position of the remote control device 200 when the trigger signal is received by the display apparatus 100 may correspond to the predetermined location of the pointing object. In such a way, the position of the remote control device 200 at that point serves as a reference position for movement of the pointing object.

Alternatively, there may be embodiments involving components for alignment of the remote control device 200 with the display apparatus 100 relative to on another, such as an optical or infrared unit. In such embodiments, there may be provided a required orientation of the remote control device 200 relative to the display apparatus 100 before control of the pointing object through the remote control device 200 begins.

Thereafter, the processor 130 may calculate the moving trajectory of the remote control device 200 by accumulating the signals received from the remote control device 200, i.e., the signals corresponding to the relative movements of the remote control device 200. The processor can track the direction in which the remote control device 200 directs or the displacement of the remote control device 200 on the virtual absolute coordinate system.

Thus, in some embodiments, the processor 130 may calculate the moving trajectory by accumulating vector signals received from the remote control device 200, and search whether the direction directed by the remote control device 200 or the displacement of the remote control device 200 is positioned within a relative pointing area or an absolute pointing area. When the direction directed by the remote control device 200 enters into the absolute pointing area, the processor 130 may calculate the virtual coordinate value corresponding to the direction of the remote control device 200 on the virtual absolute coordinate system. For example, when the movement signals consecutively received from the remote control device 200 and modified into Δx are +5→−2→+7→+2, the displacement value of the remote control device 200 on the x axis may be calculated to be 5−2+7+2=+12. Further, the processor 130 may determine that the remote control device 200 belongs to the area corresponding to the coordinate value of +12 toward the x axis on the virtual coordinate system.

Thereafter, the processor 130 may control the moving state of the pointing object according to the relative coordinate method regarding a first area including the screen of the display 110 based on the signals received from the remote control device 200 (relative pointing area to be referred below), and control the moving state of the pointing object according to the absolute coordinate method regarding a second area outside the first area (absolute pointing area to be referred below). Herein, the signals received from the remote control device 200 may be signals corresponding to the relative movement of the remote control device 200, i.e., signals corresponding to the magnitude and the direction of the movement.

In embodiments of the relative coordinate method, the pointing object may move in directions corresponding to directions of movement of the remote control device 200 when the processor 130 determines the movement of the remote control device 200 would move the pointing object on the display 110 or a surrounding margin area.

Additionally, in some embodiments, the pointing object is stationary in at least one axis when the processor 130 determines that the movement of the remote control device 200 would move the pointing object outside of the display 110 or the surrounding margin area.

The reason why the relative pointing area and the absolute pointing area may be distinguished will be explained below. Different from the absolute pointing method, the relative pointing method may adjust a moving speed of the pointing object according to the using pattern of a user. Thus, when the user use pattern indicates the remote control device 200 is moved quickly by providing an acceleration and deceleration function, the pointing object can be moved more quickly. When the user use pattern indicates the remote control device is moved slowly, the pointing object can be moved more slowly. Further, because the screen is not necessarily directed toward the remote control device 200, the remote control device 200 can be conveniently used. Thereby, in view of a user experience (UX), the screen can be conveniently used according to the relative pointing method. However, because the relative pointing method calculates the moving of the pointing object only based on the movement of the remote control device 200, when the remote control device 200 is directed outside of the screen internal area and comes back inside, offset between the position of the pointing object and the direction of the remote control device 200 may occur. Thereby, outside the screen, there may be advantageous in the absolute pointing method which can minimize the offset between the position of the pointing object and the direction of the remote control device 200.

Meanwhile, according to an embodiment, the above described first area may include a preset margin area outside the screen as well as the screen of the display 110. The margin area may be established to be defaulted or modified with a user by considering various components such as screen size and user control tendency.

In some embodiments, the margin area may be preset or defaulted as corresponding to a bezel or outer casing or housing of the display 110. Alternatively, the margin area may be larger than the area corresponding to the bezel or outer housing of the display 110. In some embodiments, the margin area is from edges of a visible area of the display screen to at least one predetermined distance outward from the visible area of the display screen.

There may be advantageous reasons as to why the relative pointing area may include the preset margin area outside the screen as well as screen area. The controlling the area directly outside the screen border with the absolute pointing method may be disadvantageous in view of the desired response. For example, when the pointing object is moved to select UI components near to the screen border and when the pointing object is out of the absolute pointing area for a little bit, the pointing object may be motionless until the direction of the remote control device 200 comes back to the relative pointing area. When the margin area outside the screen border is provided and established to be relative pointing area, a desired response may be obtained because the movement of the pointing object appears within the screen immediately after being out for a little bit.

Specifically, when the signal corresponding to the magnitude and the direction of the movement regarding the remote control device 200 is received from the remote control device 200, the pointing object may be moved based on the signal corresponding to the magnitude and direction of the received movement on the relative pointing area. Thus, the processor 130 may move and display the position of the pointing object according to the signal received from the remote control device 200 based on the position of the previously displayed pointing object. For example, when the remote control device 200 moves from a first point to a second point within the relative pointing area, the pointing object may be moved and displayed correspondingly to the distances and directions of the first and the second point.

Further, the processor 130 may control the moving state of the pointing object by accelerating and decelerating the moving speed based on the signals received on the relative pointing area. For example, when the remote control device 200 is moved quickly, the processor 130 may quickly move the pointing object to the far distance by increasing the moving speed of the pointing object. When the remote control device 200 is moved slowly, the processor 130 may slowly move the pointing object so that the pointing can be performed in detail by decreasing the moving speed of the pointing object. In this case, a user can direct and control the remote control device 200 toward convenient directions while using the remote control device 200 as desired.

In some embodiments, the moving state may be from a combination of sensors. In some embodiments, a quicker movement of the remote control device, such as a quick wrist flick in a direction, may result in the quickly moving of the pointing object. This would be in contrast to a slower detection movement in a direction.

In some embodiments, the quick movement may also be coupled with extra features depending on the user interface being displayed on the display apparatus. In some embodiments where a user interface is larger than the display screen, the quick movement may result in the shifting of the pointing object and the user interface displayed. This may aid convenience as it reduces the effort required by the user.

In some embodiments, the processor 130 may move the pointing object to the corresponding position on the virtual absolute coordinate system based on the added (or accumulated) signals in which the signals corresponding to the magnitude and the direction of the movement received from the remote control device 200 are added. In this case, the moving speed of the pointing object may not be applied to the acceleration and deceleration function. Thus, on the absolute pointing area, the position and the movement of the pointing object may be uniform to the direction of the remote control device 200, and the standard position should be established because the absolute coordinate values are calculated based on the specific standard point. Herein, the direction of the remote control device 200 may be based on a movement of a virtual extended line where the remote control device 200 points towards the plane formed by the display 110.

Meanwhile, the processor 130 may control the moving state of the pointing object based on the virtual absolute coordinate system generated with the standard of the position where the pointing object is initially displayed on the screen according to the receiving of the trigger signal regarding the absolute pointing area. Thus, the processor 130 may move and display the position of the pointing object based on the standard position where the pointing object is initially displayed according to the trigger signal.

Meanwhile, when the remote control device 200 is determined to have entered into the absolute pointing area while the moving state of the pointing object is controlled on the relative pointing area according to the relative coordinate method, the processor 130 may calculate the coordinate value of the pointing object on the virtual absolute coordinate system generated based on the standard point. Therefore, even when the pointing object hits the border of the screen, the direction of the remote control device 200 and the display position of the pointing object may not be offset.

However, the absolute pointing area may be positioned outside the screen according to an embodiment. Thus, when the remote control device 200 enters into the absolute pointing area, the pointing object may be displayed on the border area of the screen according to the absolute coordinate system. When the remote control device 200 enters into the absolute pointing area, the remote control device 200 may be directed toward the absolute pointing area outside the screen. Accordingly, the pointing object may be moved to the border area of the screen, and at least one of the x and the y coordinate value may be displayed to be fixed when the remote control device 200 moves within the absolute pointing area.

When the remote control device 200 is determined to have entered into the margin area from the screen area within the relative pointing area, the processor 130 may control the moving state of the pointing object on the margin area according to the relative coordinate method. However, when the remote control device 200 is determined to have entered into the margin area within the relative pointing area from the absolute pointing area, the processor 130 may control the moving state of the pointing object on the margin area according to the absolute coordinate method. Thus, regarding the margin area, the processor 130 may control the moving state of the pointing object according to the method of the previously positioned area before entering into the margin area.

There may be advantageous reasons as to why the margin area outside the screen border may be modified into the relative pointing area or the absolute pointing area. When the remote control device 200 is directed towards the external area of the screen while the pointing object is controlled within the screen, the pointing object may operate on the margin area according to the relative pointing method. In this way, the response can be obtained because the moving of the pointing object appears within the screen immediately when being out of the screen for a little bit. However, when the remote control device 200 is totally out from the screen toward the absolute pointing area and comes back to the margin area, the response may not be necessarily obtained. Thus, as described above, the margin area may be established to be absolute pointing area, which minimizing the offset between the direction of the remote control device 200 and the display position of the pointing object. Thereby, the quick response can be provided near to the screen (i.e., margin area) and the offset can be minimized on the area far from the screen.

Specifically, when the remote control device 200 is determined to have entered into the margin area within the relative pointing area from the absolute pointing area, the processor 130 may fix and display at least one of the x and the y coordinate value regarding the pointing object according to the absolute coordinate method. Further, when the remote control device 200 is determined to have entered into the screen area of the display from the margin area, the processor 130 may move and display the position of the pointing object according to the relative coordinate method. Thus, when the remote control device 200 consecutively enters into the relative pointing area from the absolute pointing area, the processor 130 may maintain the absolute coordinate method on the margin area included in the relative pointing area, and modify into the relative pointing method after entering into the screen.

In some embodiments, when the remote control device 200 moves from the absolute pointing area into the margin area, the pointing object may move from the displaying according to the absolute coordinate method to a relative coordinate method in the margin area. In such a case, the pointing object may disappear from being displayed on the edge of the screen according to the absolute coordinate method when the remote control device 200 is moving in the margin area. In this way, the user may become away that the remote control device is in the margin area and provide finer control of the pointing object at the edges of the screen.

According to the various embodiments described above, the quick response can be provided near to the screen of the display apparatus 100 (i.e., margin area) and the offset of the pointer can be minimized on the area far from the screen.

Figure 3A:
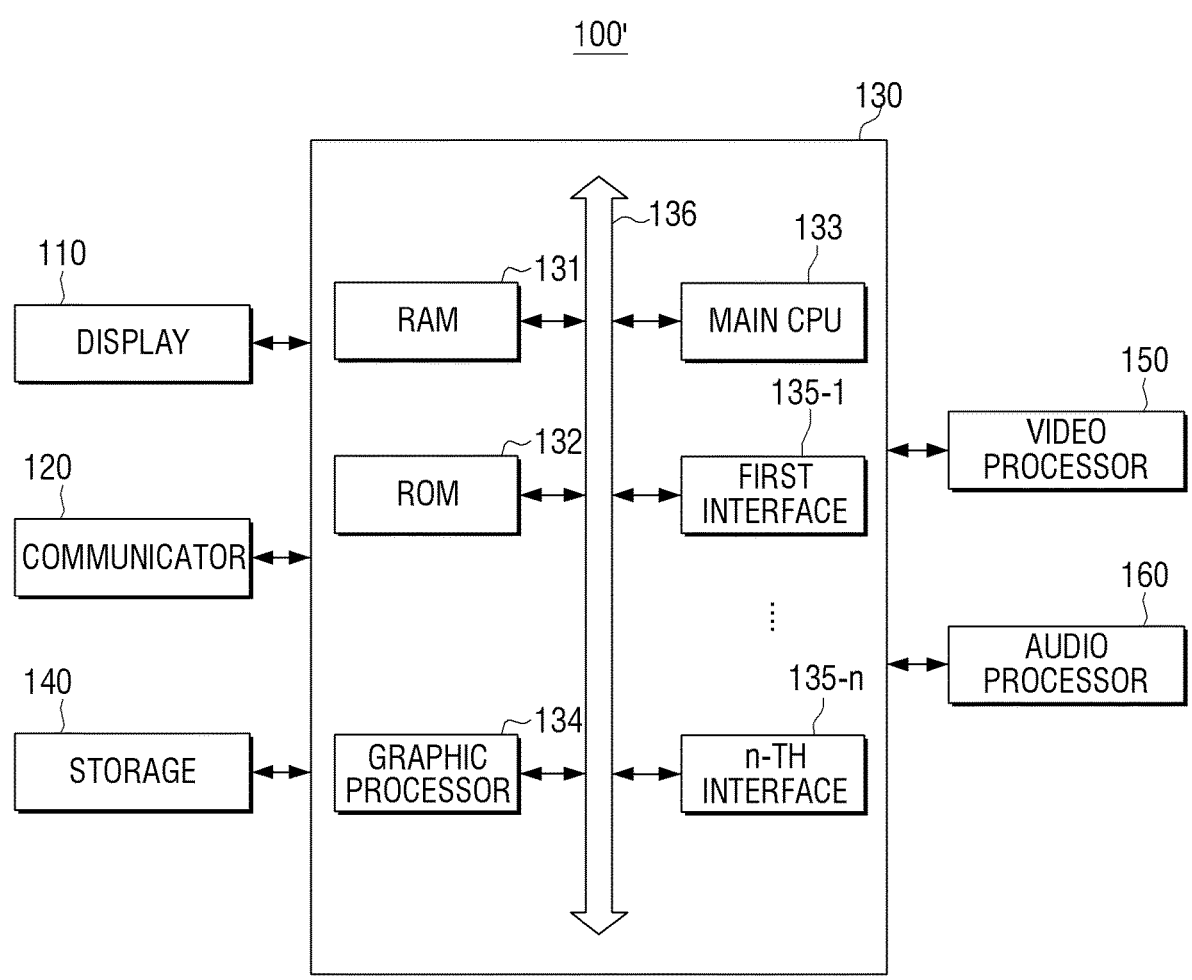
FIGS. 3A and 3B are block diagrams illustrating the display apparatus in FIG. 2.
Figure 3B:
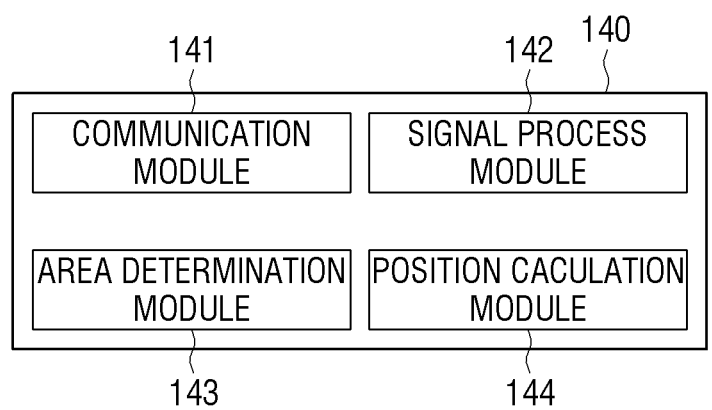

FIGS. 3A and 3B are block diagrams illustrating details of the display apparatus in FIG. 2.

FIG. 3A is a block diagram illustrating the display apparatus in FIG. 2. Referring to FIG. 3A, the display apparatus 100' includes the display 110, the communicator 120, the processor 130, a storage 140, a video processor 150 and an audio processor 160. The elements of FIG. 3A overlapped with the elements of FIG. 2 will not be specifically explained below.

The processor 130 may control general operation of the display apparatus 100'.

Specifically, the processor 130 includes RAM 131, ROM 132, a main CPU 133, a graphic processor 134, a first to an n-th interface 135-1~135-n and a bus 136.

RAM 131, ROM 132, the main CPU 133, the graphic processor 134, and the first to the n-th interface 135-1~135-n may be connected to each other through the bus 136.

The first to the n-th interface 135-1~135-n may be connected to the above described elements. One of the interfaces may be network interface connected to an external device through network.

The main CPU 133 may access to the storage 140, and perform the booting by using the stored O/S. Further, the main CPU 133 may perform various operations by using the various programs, contents and data stored in the storage 140.

ROM 132 may store a command set for the system booting. When a turn-on command is inputted and when the electrical power is provided, the main CPU 133 may copy the stored O/S to RAM 131 according to the stored command in ROM 132, and boot the system by implementing O/S. When the booting completes, the main CPU 133 may copy the various application programs stored in the storage 140 to RAM 131, and perform various operations by implementing the application programs copied to RAM 131.

The graphic processor 134 may generate the screen including various objects such as an icon, image, and text, e.g., the screen including the pointing object, by using a calculator (not illustrated) and a renderer (not illustrated). A calculator (not illustrated) may calculate feature values such as coordinate value, shape, size and color in which each object will be displayed according to the layout of the screen based on the received control command. A renderer (not illustrated) may generate the various layouts of the screen including objects based on the calculated feature values. The screen generated in the renderer (not illustrated) may be displayed within the user interface area of the display 110.

Meanwhile, the above described operations of the processor 130 may be performed by the programs stored in the storage 140, as illustrated in FIG. 3B.

The storage 140 may store various data such as Operating System (O/S) software module to drive the display apparatus 100' and various multimedia contents.

Specifically, the storage 140 may store programs such as a communication module 141 requested for the providing the pointing mode, a signal process module 142, an area determination module 143, and a position calculation module 144 according to an embodiment.

The processor 130 may receive a signal from the remote control device 200 by using the communication module 141 and process the received signal by using the signal process module 142.

For example, when the signal corresponding to the movement is received from the remote control device 200, the processor 130 may convert the signal into X and Y coordinate values of the display apparatus 100 by applying the signal process algorithm. The position of the pointing object may be designated by using the converted coordinate values. Thereafter, the processor 130 may designate the coordinate value of the pointing object by mapping the converted X and Y coordinate values with the X and Y coordinate values of the pointing object on a UI screen of the display apparatus 100'.

Further, the processor 130 may determine whether the remote control device 200 is positioned within the relative pointing area or the absolute pointing area by using the area determination module 143 based on the values processed in the signal process module 142.

Further, the processor 130 may calculate the position where the pointing object is displayed on the screen by using the position calculation module 144 based on the processed values through the signal process module 142 and the determined values through the area determination module 143.

Besides, the display apparatus 100' may further include the video processor 150 performing the processing of video data, the audio processor 160 performing the processing of audio data, a speaker outputting various notification sounds or voice messages as well as various audio data processed in the audio processor 160, a camera configured to photograph still images or videos according to the control of a user or software, and a microphone configured to receive user voices or other sounds and convert them into audio data.

Meanwhile, the above embodiment describes that the signal processing according to the movement of the remote control device 200 may be performed by the display apparatus 100'. However, this is merely one exemplary embodiment. The signal processing may be performed through a signal process algorithm stored within the remote control device 200.

Figure 4:
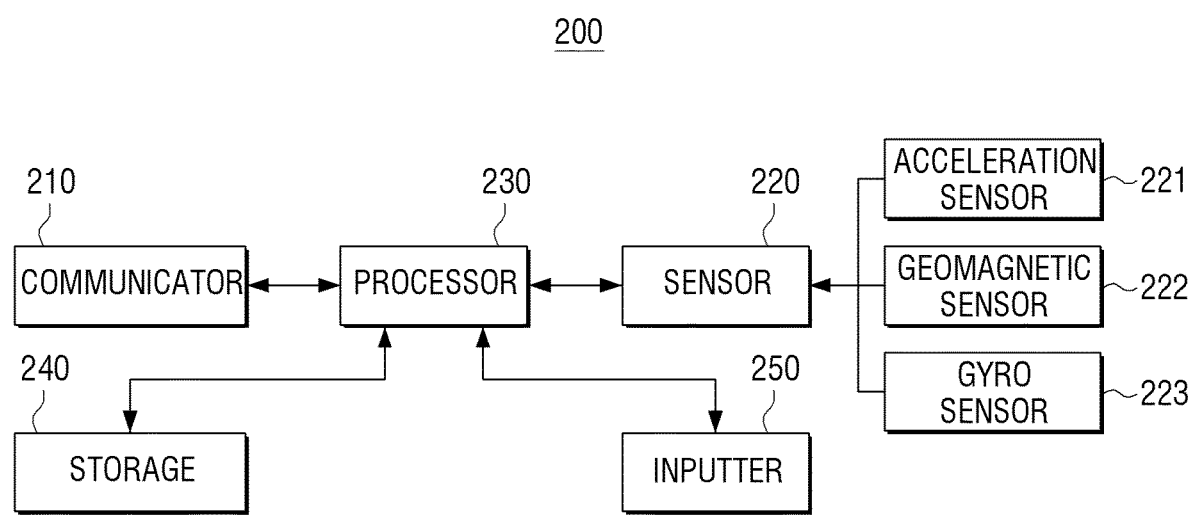
FIG. 4 is a block diagram illustrating a remote control device according to an exemplary embodiment.

FIG. 4 is a block diagram illustrating an exemplary embodiment of the remote control device.

Referring to FIG. 4, the remote control device 200 includes a communicator 210, a sensor 220, a storage 240, an inputter 250, and a processor 230.

The communicator 210 may perform the communication with the display apparatus 100. The communicator is similar to that of the communicator 120 in the display apparatus 100.

The sensor 220 is provided to sense the movement of the remote control device 200. The sensor 220 may include various sensors such as an acceleration sensor 221, a geomagnetic sensor 222 and a gyro sensor 223. The various sensors included in the sensor 220 may sense the three-dimensional movement of the remote control device 200 through one sensor or a combination of at least two sensors.

The acceleration sensor 221 is a sensor configured to measure the dimensional movement of the remote control device 200. Thus, the acceleration sensor 221 may senses changes in linear acceleration and/or angular acceleration generated when a user moves the remote control device 200. The acceleration sensor 221 may sense the acceleration in three axis directions. Thus, the information related with the tilting of the remote control device 200 may be obtained by using the acceleration sensor 221.

The geomagnetic sensor 222 is a sensor configured to measure the azimuth. Thus, the geomagnetic sensor 222 may indicate sensor which measures the azimuth by sensing the magnetic field formed toward the south and north direction of the earth. The geomagnetic sensor 222 may sense the geomagnetic toward the three axis direction. The north direction measured by the geomagnetic sensor 222 may be magnetic north. However, even when the geomagnetic sensor 222 measures the direction of the magnetic north, the direction of true north may be outputted through internal calculation.

The gyro sensor 223 is an inertia sensor that measures the rotation angular velocity of a remote control device 200. Thus, the gyro sensor 223 may indicate the current direction by using the inertia force maintained in the rotating object. The gyro sensor 223 may measure the rotation angular velocity toward two axis directions.

Embodiments may also involve at least one sensor for alignment of the remote control device with the display apparatus 100 relative to on another, such as an optical or infrared unit. Such a sensor may be on at least one of the display apparatus and the remote control device. In certain embodiments, an optical unit for the display apparatus may allow for the display apparatus to detect the orientation or position of the remote control device. Alternatively, an optical unit for the remote control device 200 may allow for the detection of the orientation or position of the display apparatus for remote control device 200.

The processor 230 may perform various calculating operations according to the various sensing signals provided from the sensor 220. For example, when the movement of the remote control device 200 is sensed by the acceleration sensor 221, the geomagnetic sensor 222, and the gyro sensor 223, the processor 230 may control the transmitting the corresponding sensing signal to the display apparatus 100. For example, the processor 230 may perform the pre-processing regarding the received sensing values and the transmitting to the display apparatus 100. For example, the processor 230 may convert the sensing values which are modified to be digital values into the physical amount, perform the fitting the separates axes of the acceleration sensor, the geomagnetic sensor and the gyro sensor into one defined axis, and perform the pre-processing such as removing the electrical noises of the sensors and the unintended high frequency movement through the low bandwidth pass filtering.

However, when the signal received through the signal process module 142 of FIG. 3B is processed in the remote control device 200, the processor 230 may calculate according to the sensed signal process algorithm and transmit the calculated value to the display apparatus 100. Herein, the detailed constitution of the processor 230 is similar to the processor 130 of the display apparatus 100' in FIG. 3A.

Meanwhile, the above described operation of the processor 230 may be performed by the programs stored in the storage 240.

Thus, the storage 240 may store the various data such as O/S software to drive the remote control device 200 and signal process algorithm to calculate the sensing signals by the sensor 220.

The inputter 250 may be implemented in a form that includes a button or a touch pad. For example, the inputter 250 may include a power button receiving a user command to turn on/off the electrical power and a centering button displaying the pointing object on the screen and establishing the standard position. For example, when the power of the remote control device 200 is turned on, the remote control device 200 may perform the pairing with the display apparatus 100. When the pairing completes and when a user manipulates the pushing on the centering button (not illustrated), the center of the display screen in the display apparatus 100 may display the pointing object.

Figure 5A:
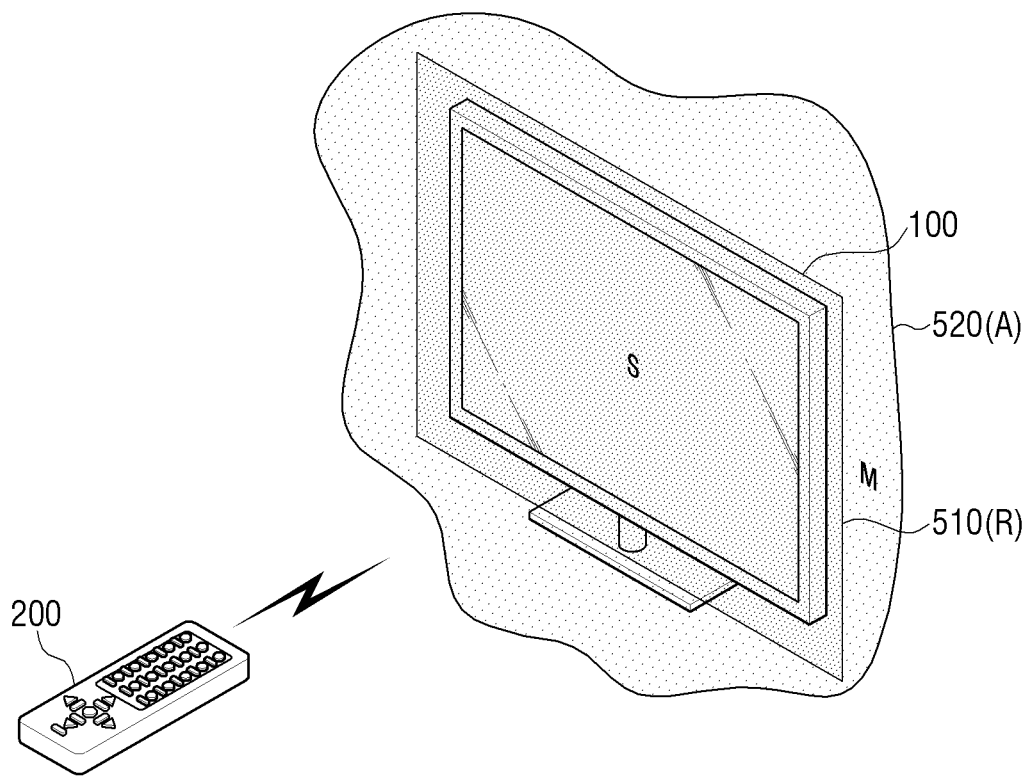
FIGS. 5A and 5B are diagrams illustrating a relative pointing area and an absolute pointing area for the display apparatus according to an exemplary embodiment.
Figure 5B:
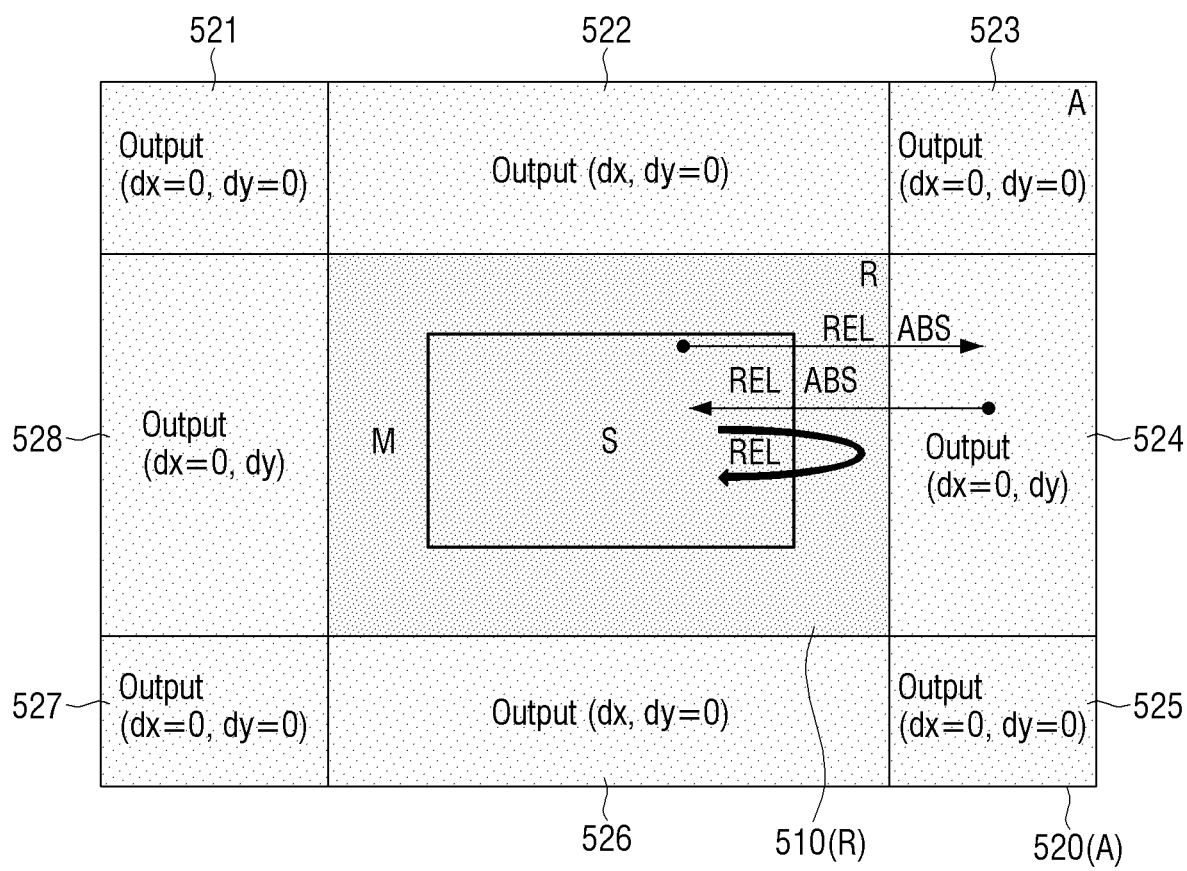

FIGS. 5A and 5B are diagrams illustrating relative pointing area and the absolute pointing area of the display apparatus.

Referring to FIG. 5A, the relative pointing area 510 may include the margin area (M) which is established outside the screen as well as screen area (S) of the display apparatus 100. Herein, the size of the margin area (M) may be established to be a default value based on the screen size of the display apparatus 100. However, in some embodiments, the size of the margin area may be re-established by considering the control tendency of a user.

Further, the absolute pointing area 520 may be external area from the relative pointing area 510.

Referring to FIG. 5B, on the relative pointing area 510, the moving state of the pointing object may be controlled based on the signal corresponding to the magnitude and the direction of the movement received from the remote control device 200 according to the related relative coordinate method. However, where the absolute pointing area 520 is positioned outside the screen, the display position of at least one among the x and the y axis regarding the pointing object may be fixed on the border area of the screen according to the area where the remote control device 200 is positioned.

For example, when the remote control device 200 is positioned on the screen right and left areas 524, 528 among the absolute pointing area 520, the x coordinate value of the pointing object may not change. When being positioned on the screen upper and lower areas 522, 526 among the absolute pointing area 520, the y coordinate value of the pointing object may not change. Further, when the remote control device is positioned on the overlapping areas 521, 523, 525, 527 where the left and right areas and the upper and lower areas are overlapped with each other, both of the x and the y coordinate value regarding the pointing object may not change.

Figure 6:
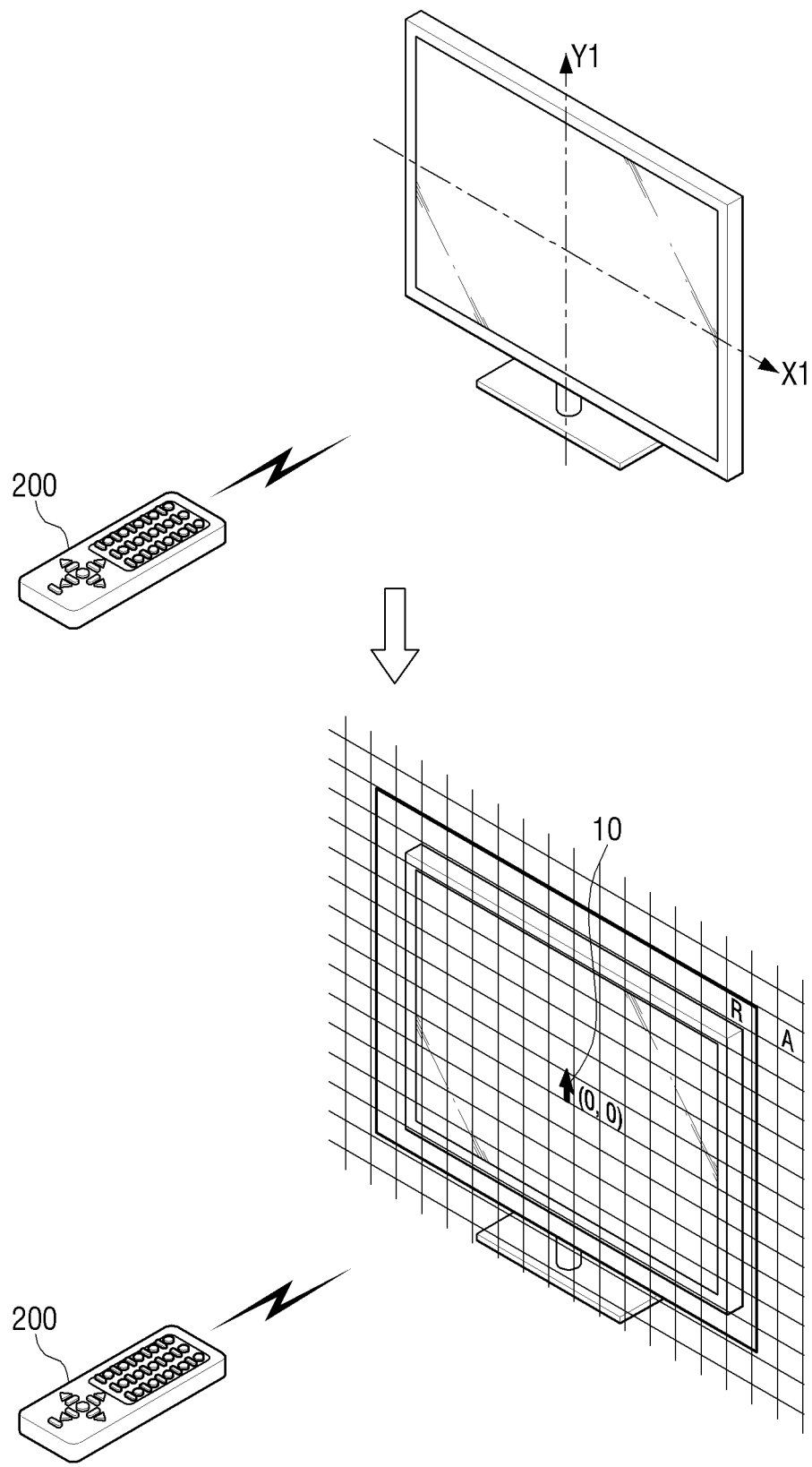
FIG. 6 is a diagram illustrating a method for establishing the standard position and generating the absolute coordinate system according to an exemplary embodiment.

FIG. 6 is a diagram illustrating a method for establishing the standard position and generating the absolute coordinate system according to an embodiment.

Referring to FIG. 6, when the trigger signal, e.g., the centering signal is received from the remote control device 200, the pointing object 10 may be displayed on the screen center area, and the virtual absolute coordinate system may be generated based on the center area where the corresponding pointing object 10 may be displayed.

Thereafter, the moving state of the pointing object 10 may be controlled on the relative pointing area (R) according to the relative coordinate method and on the absolute pointing area (A) according to the absolute coordinate method based on the virtual absolute coordinate system.

Figure 7A:
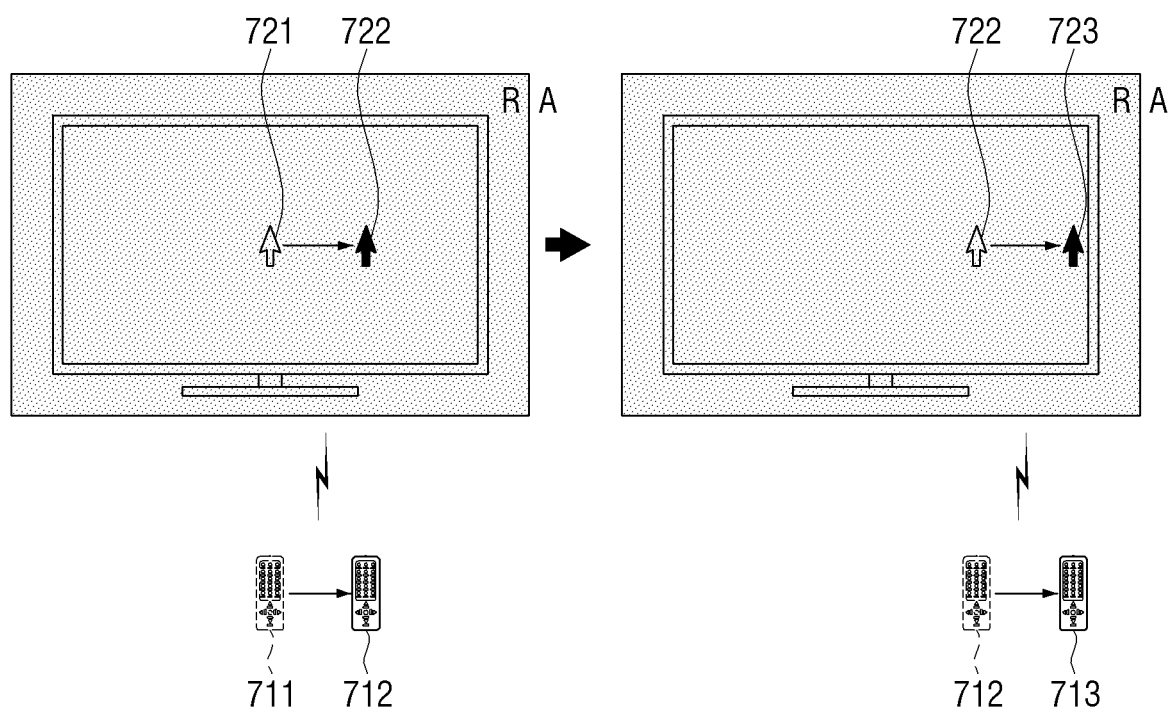
FIGS. 7A and 7B are diagrams illustrating a moving state of a pointing object on the relative pointing area and the absolute pointing area according to an exemplary embodiment.
Figure 7B:
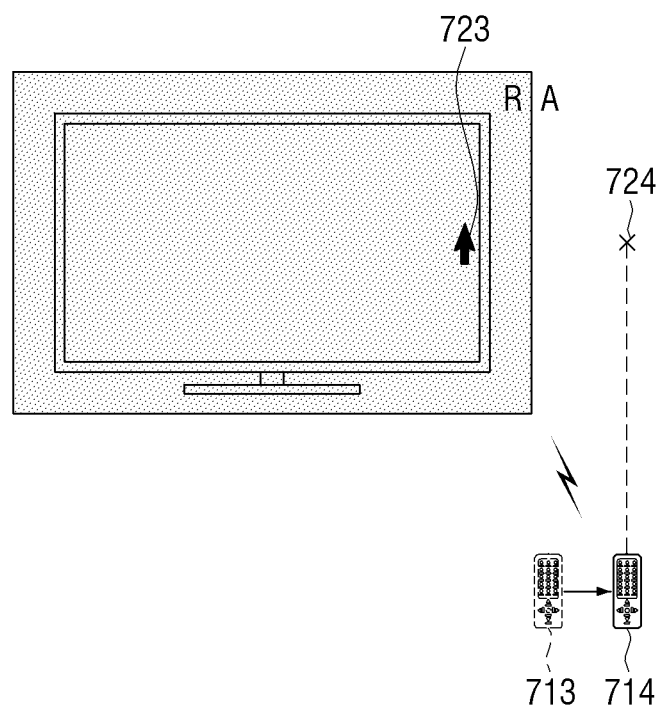

FIGS. 7A and 7B are diagrams illustrating the moving state of the pointing object on the relative pointing area and the absolute pointing area according to an embodiment.

FIG. 7A is a diagram illustrating the moving state of the pointing object on the relative pointing area. When the remote control device 200 moves from a first point 711 to a second point 712 toward the x axis direction on the screen area within the relative pointing area, the pointing object 10 may be moved correspondingly to the distance and the direction from the first point 711 to the second point 712 (721→722).

Specifically, because the relative pointing area includes the margin area outside the display screen according to an embodiment, when assuming that the remote control device 200 moves from the second point 712 to a third point 713 toward the x axis direction within the margin area, the pointing object 10 may be moved correspondingly to the distance and the direction of the second point 712 and the third point 713 (722→723).

FIG. 7B is a diagram illustrating the moving state of the pointing object on the absolute pointing area. When assuming that the remote control device 200 moves from the third point 713 to a fourth point 714 toward the x axis direction on the absolute pointing area, the pointing object 10 may be at position 723 and not move to the position 724 as might correspond to the direction directed by the remote control device 200 at the fourth point 714. Thus, the pointing object 10 may be fixed and displayed on the border area of the right screen.

Figure 8:
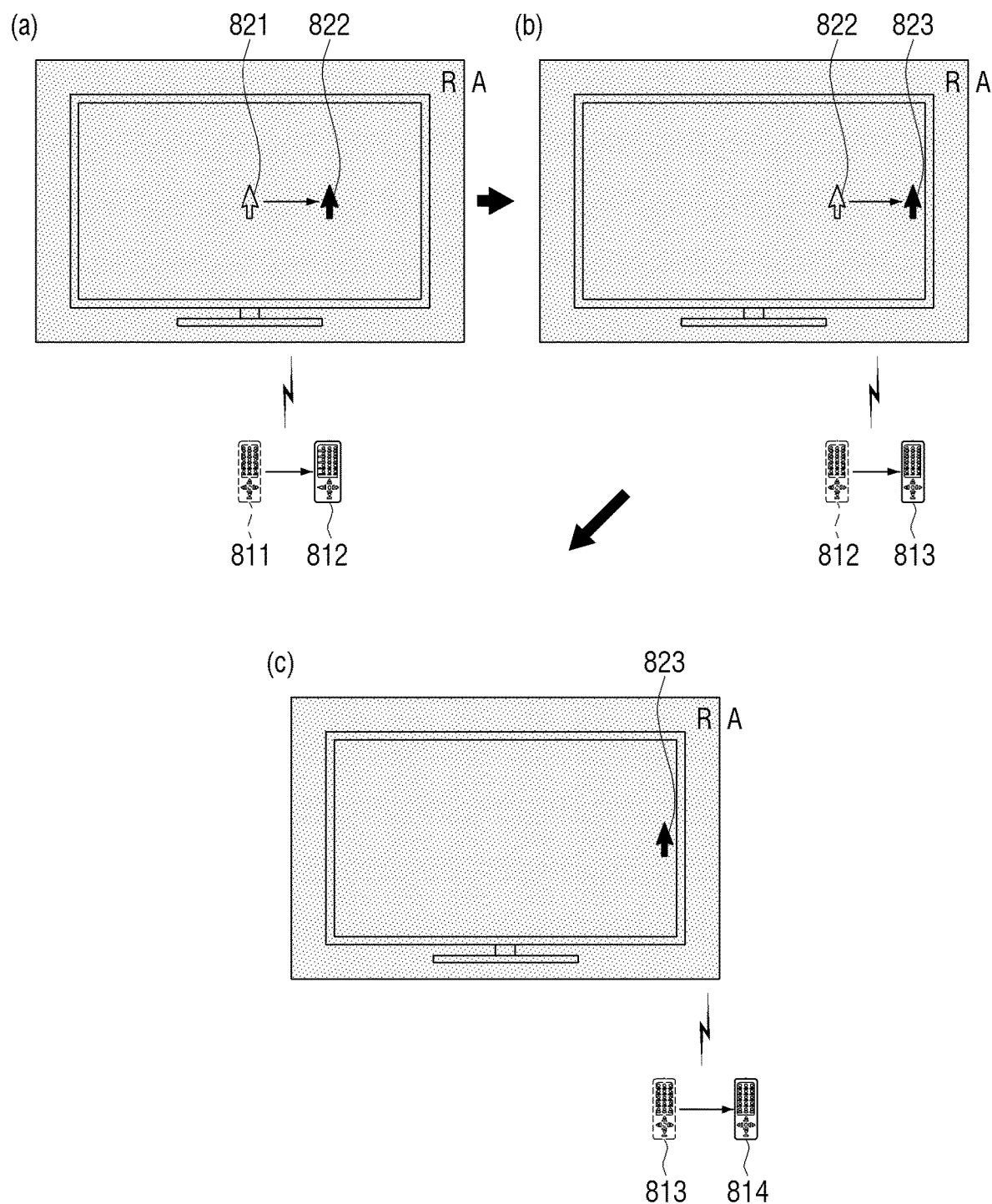
FIG. 8 is a diagram illustrating a moving state of the pointing object when entering into the absolute pointing area from the relative pointing area according to an exemplary embodiment.

FIG. 8 is a diagram illustrating the moving state of the pointing object when entering from the relative pointing area into the absolute pointing area according to an exemplary embodiment.

Referring to (a) and (b) of FIG. 8, when the remote control device 200 moves within the relative pointing area (811→812→813), the pointing object 10 may be moved correspondingly to the distance and the direction of the remote control device 200 according to the relative coordinate method (821→822→823).

Thereafter, referring to (c) of FIG. 8, when the remote control device 200 enters into the absolute pointing area (813→814) while the pointing object 10 is positioned on the border area 823 of the right screen, the remote control device 200 may be directed toward the absolute coordinate area outside the screen, the pointing object 10 may be fixed and displayed on the border area 823 of the screen.

Figure 9:
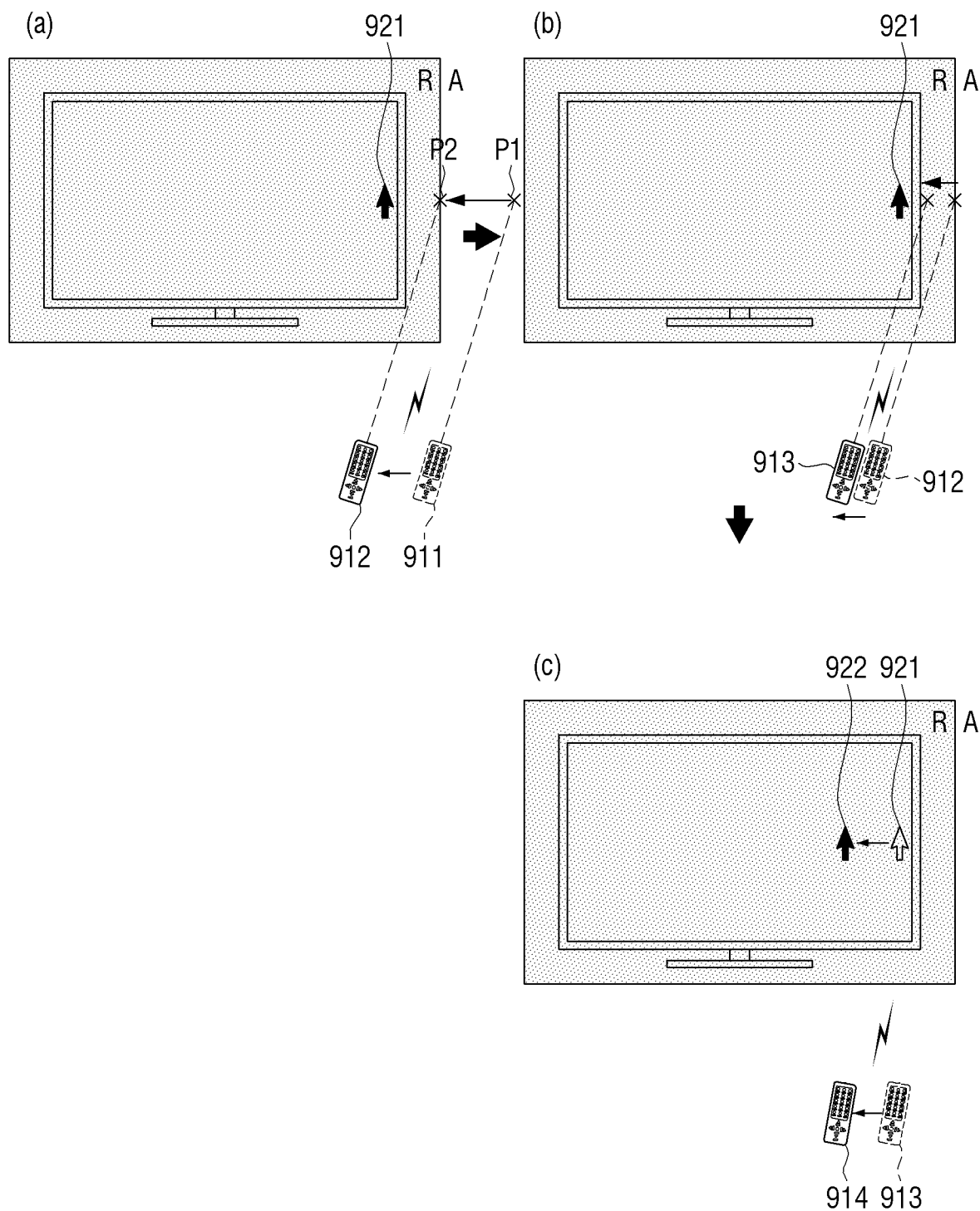
FIG. 9 is a diagram illustrating a moving state of the pointing object when entering into the relative pointing area from the absolute pointing area according to an exemplary embodiment.

FIG. 9 is a diagram illustrating the moving state of the pointing object when entering from the absolute pointing area into the relative pointing area according to an exemplary embodiment.

Referring to (a) of FIG. 9, when the remote control device 200 moves within the absolute pointing area (911→912), the pointing object 10 may be fixed and displayed on the border area 921 of the right screen according to the absolute coordinate method.

Thereafter, referring to (b) of FIG. 9, when the remote control device 200 enters from the absolute pointing area into the margin area within the relative pointing area (912→913), the pointing object 10 may be fixed and displayed on the border area 921 of the screen according to the absolute coordinate method.

Referring to (c) of FIG. 9, when the remote control device 200 moves within the relative pointing area (913→914), the pointing object 10 may be moved correspondingly to the distance and the direction of the remote control device 200 according to the relative coordinate method (921→922).

Figure 10:
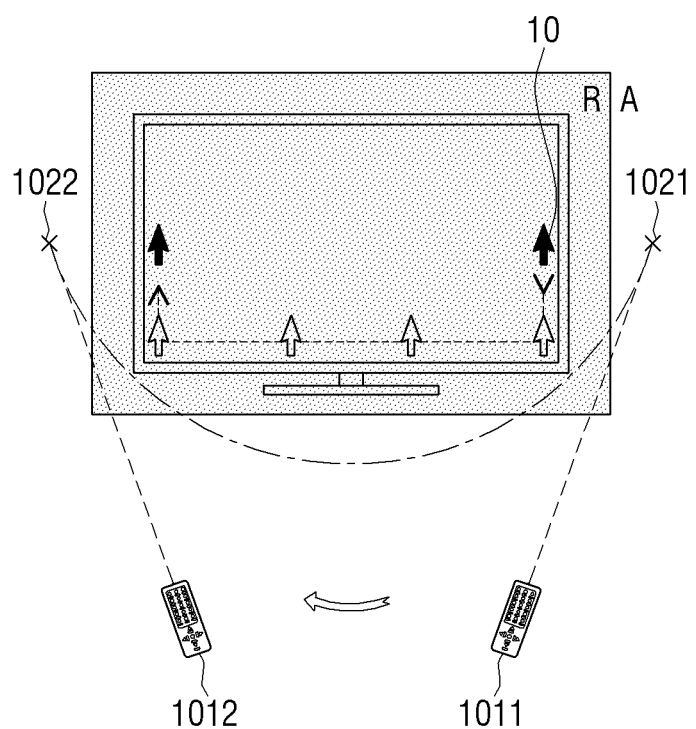
FIG. 10 is a diagram illustrating a moving state of the pointing object when moving within the absolute pointing area according to an exemplary embodiment.

FIG. 10 is a diagram provided to explain the moving state of the pointing object when entering within the absolute pointing area according to an embodiment.

Referring to FIG. 10, when the remote control device 200 moves from the absolute pointing area 1021 on the right of the display apparatus 100 (i.e., directed toward one point 1011 within the absolute pointing area) into the absolute pointing area 1022 on the left of the display apparatus 100 (i.e., directed toward another point 1012 within the absolute pointing area) within the absolute pointing area and the margin area outside the screen, the pointing object 10 may be moved according to the screen boundary from the border area of the right screen to the border area of the left screen according to the absolute coordinate method. Thus, when moving within the absolute pointing area and when entering from the absolute pointing area into the preset margin area outside the screen, the moving state may be controlled according to the absolute coordinate method. Thus, at least one of the x and the y coordinate regarding the pointing object may be fixed and moved, and thus, the pointing object 10 may be moved according to the screen boundary area.

Figure 11:
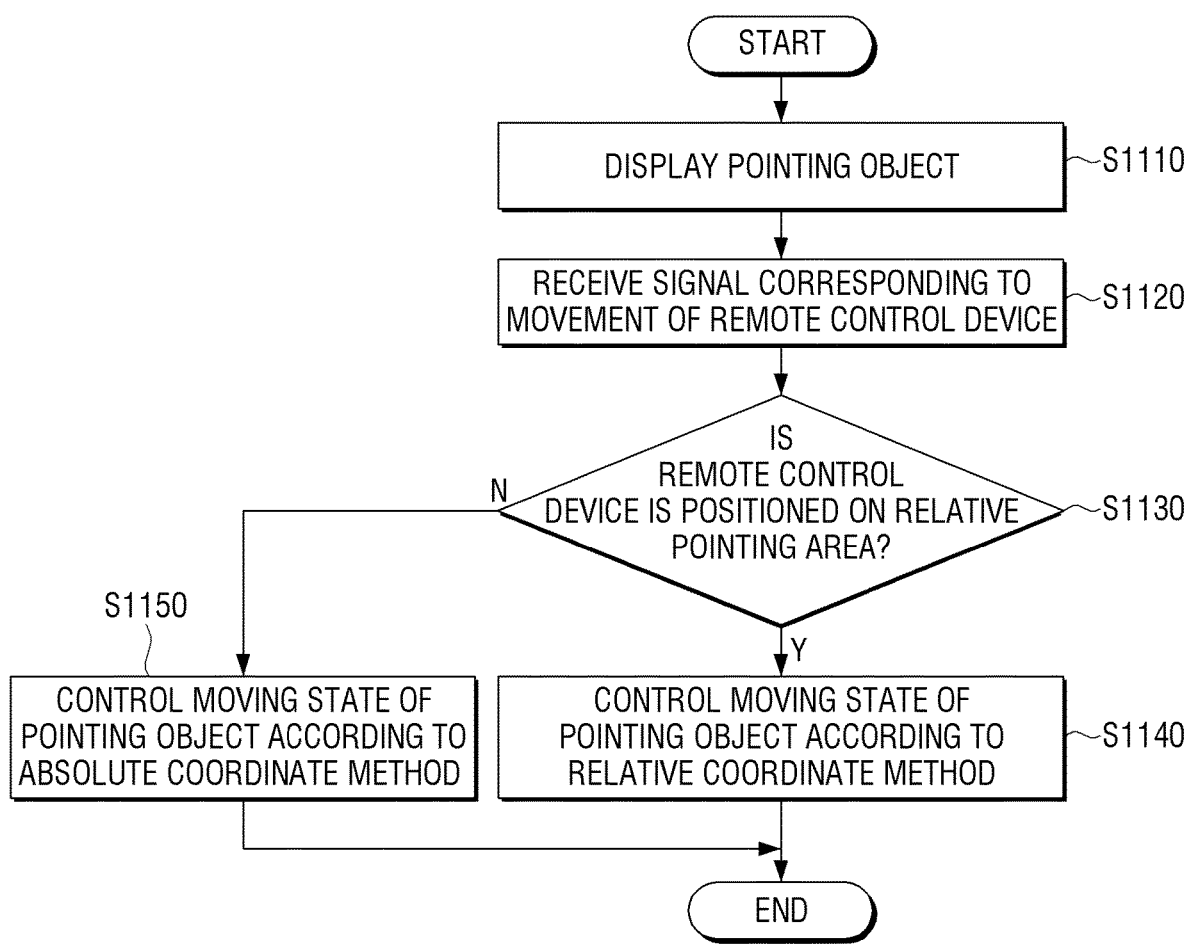
FIG. 11 is a flowchart illustrating a control method of the display apparatus according to an exemplary embodiment.

FIG. 11 is a flowchart illustrating a control method of the display apparatus according to an embodiment.

According to the control method of the display apparatus, the pointing object may be displayed according to a preset event at step S1110. Herein, the preset event may be event in which the trigger signal to establish the standard position is received from the remote control device.

At step S1120, a signal corresponding to the movement of the remote control device may be received.

At step S1130, it is determined whether the remote control device is positioned on the relative pointing area, based on the signal received from the remote control device.

When the remote control device is determined to be positioned on the relative pointing area at step S1130:Y, the moving state of the pointing object may be controlled according to the relative coordinate method at step S1140. Herein, the relative pointing area may include the display screen and the preset margin area outside the screen.

Further, when the remote control device is determined not to be positioned on the relative pointing area at step S1130: N, the moving state of the pointing object may be controlled according to the absolute coordinate method at step S1150.

Further, the control method may include the displaying the pointing object on the standard position when the trigger signal to establish the standard position on the screen is received from the remote control device and the generating the virtual absolute coordinate system based on the standard position where the pointing object is displayed.

Further, the control method may include the calculating of the moving trajectory of the remote control device by accumulating the received vector signals when the vector signals corresponding to the magnitude and the direction of the movement regarding the remote control device are received from the remote control device and the determining whether the remote control device belongs to the relative pointing area or the absolute pointing area based on the calculated moving trajectory.

At steps S1140 and S1150, the pointing object may be moved on the position corresponding to the magnitude and the direction of the movement regarding the remote control device on the relative pointing area, and moved on the position corresponding to the direction of the remote control device on the virtual absolute coordinate system of the absolute pointing area.

Also, at steps S1140 and S1150, when the remote control device is positioned within the relative pointing area, the moving state of the pointing object may be controlled by accelerating and decelerating the moving speed of the pointing object based on the signal received from the remote control device. When the remote control device is positioned within the absolute pointing area, the pointing object may be moved to the coordinate value corresponding to the direction of the remote control device on the virtual absolute coordinate system without accelerating and decelerating the moving speed of the pointing object.

Further, at steps S1140 and S1150, when the remote control device is determined to have entered from the screen area into the margin area, the moving state of the pointing object may be controlled according to the relative coordinate method. When the remote control device is determined to have entered from the absolute pointing area into the margin area, the moving state of the pointing object may be controlled according to the absolute coordinate method.

At steps S1140 and S1150, when the remote control device is determined to have entered into the absolute pointing area while the moving state of the pointing object is controlled on the relative pointing area according to the relative coordinate method, the pointing object may be moved and displayed on one border area of the screen according to the direction in which the remote control device moves.

Additionally, at steps S1140 and S1150, when the remote control device moves within the absolute pointing area, at least one of the x and the y coordinate value regarding the pointing object may be fixed and displayed according to the absolute coordinate method.

Also, at steps S1140 and S1150, when the remote control device is determined to have entered from the absolute pointing area into the margin area of the relative pointing area, at least one of the x and the y coordinate value regarding the pointing object may be fixed and displayed according to the absolute coordinate method. When the remote control device is determined to have entered from the margin area into the screen area of the display, the position of the pointing object may be moved and displayed according to the relative coordinate method.

According to one or more of the embodiments described above, the advantages of the relative coordinate method and the absolute coordinate method may be used to the maximum, and any perceived disadvantages may be compensated with each other. Thus, the user can have enhanced convenience.

In some embodiments, the methods according to the various embodiments may be implemented by only upgrading the software in the related display apparatus only.

Furthermore, a program for performing the control methods of the embodiments may be provided non-transitory computer readable recording medium.

For example, may be provided non-transitory computer readable recording medium storing the program performing the receiving the signal corresponding to the movement of the remote control device, the controlling the moving state of the pointing object based on the signal received from the remote control device on the relative pointing area including the display screen according to the relative coordinate method, and controlling the moving state of the pointing object on the absolute pointing area outside the relative pointing area according to the absolute coordinate method.

The "non-transitory computer readable recording medium" indicates a medium which stores data semi-permanently and can be read by devices, rather than such a medium that stores data temporarily, such as register, cache, or memory. Specifically, the above various applications or programs may be stored and provided in non-transitory computer readable recording medium such as CD, DVD, hard disk, Blu-ray disc, USB, memory card, or ROM.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments. While one or more exemplary embodiments have been described with reference to the figures above, it will be understood by those of ordinary skill in the art that various changes in form and details may be made therein without departing from the spirit and scope as defined by the following claims.

What is claimed is:

1. A display apparatus, comprising:
a display;
a communicator; and
a processor configured to:
control the display to display a pointing object;
based on receiving a signal corresponding to a movement of a remote control device from the remote control device, control a moving state of the pointing object according to the received signal,
control, for a first area comprising a screen of the display, the moving state of the pointing object according to a relative coordinate method,
control, for a margin area outside the screen of the display, the moving state of the pointing object according to a coordinate method, among the relative coordinate method and the absolute coordinate method, selected based on a movement direction of the remote control device,
control, for a second area outside the margin area, the moving state of the pointing object according to the absolute coordinate method,
based on identifying that the movement direction of the remote control device is a first direction from the first area into the margin area, control the moving state of the pointing object according to the relative coordinate method, and
based on identifying that the movement direction of the remote control device is a second direction from the second area into the margin area, control the moving state of the pointing object according to the absolute coordinate method,
wherein the margin area is different from the first area and the second area,
wherein the first area covers a first space that includes the screen,
wherein the second area covers a second space outside of the screen, and
wherein the margin area covers a third space between the first space and the second space.

2. The display apparatus of claim 1, wherein, when vector signals corresponding to a magnitude and a direction of the remote control device are received from the remote control device, the processor calculates a moving trajectory of the remote control device by summing the received vector signals and determines whether the remote control device belongs to the first area or the second area based on the calculated moving trajectory.

3. The display apparatus of claim 1, wherein, when a trigger signal for establishing a standard position on the screen is received from the remote control device, the processor displays the pointing object on the standard position and generates a virtual absolute coordinate system based on the standard position in which the pointing object is displayed.

4. The display apparatus of claim 3, wherein, when a signal corresponding to a magnitude and a direction of the movement regarding the remote control device is transmitted from the remote control device, the processor moves the pointing object to a position corresponding to the magnitude and the direction of the movement regarding the first area, and moves the pointing object to the position corresponding to a direction as directed by the remote control device on the virtual absolute coordinate system regarding the second area.

5. The display apparatus of claim 3, wherein:
when the remote control device is positioned within the first area, the processor controls the moving state by accelerating and decelerating the pointing object based on the transmitted signal, and
when the remote control device is positioned within the second area, moves the pointing object to a coordinate value corresponding to a direction as directed by the remote control device on the virtual absolute coordinate system without accelerating and decelerating the moving speed of the pointing object.

6. The display apparatus of claim 3, wherein, when the remote control device is determined to have entered into the second area while the moving state of the pointing object is controlled according to the relative coordinate method on the first area, the processor controls movement of the pointing object such that the pointing object is moved to one border area of the screen according to a direction in which the remote control device moves.

7. The display apparatus of claim 6, wherein, when the remote control device moves within the second area, the processor is configured to perform the absolute coordinate method to display the pointing object such that at least one of x and y coordinate values of the pointing object is fixed.

8. The display apparatus of claim 3, wherein,
when the remote control device is determined to have entered from the second area into the margin area of the first area, the processor is configured to perform the absolute coordinate method to display the pointing object such that an x or a y coordinate value of the pointing object corresponding to a direction of the movement from the second area into the margin area of the first area is fixed; and
when the remote control device is determined to have entered from the margin area into the first area of the display, the processor is configured to perform the relative coordinate method to display the pointing object such that the position of the pointing object is moved.

9. A control method of a display apparatus, the control method comprising:
displaying a pointing object; and
based on receiving a signal corresponding to a movement of a remote control device from the remote control device, controlling a moving state of the pointing object according to the received signal,
wherein the controlling the moving state of the pointing object comprises:
controlling, for a first area comprising a screen of the display, the moving state of the pointing object according to a relative coordinate method,
controlling, for a margin area outside the screen, the moving state of the pointing object according to a coordinate method, among the relative coordinate method and the absolute coordinate method, selected based on a movement direction of the remote control device, and
controlling, for a second area outside the margin area, the moving state of the pointing object according to the absolute coordinate method, and
wherein the controlling the moving state of the pointing object for the margin area outside the screen comprises:
controlling, based on identifying that the movement direction of the remote control device is a first direction from the first area into the margin area, the moving state of the pointing object according to the relative coordinate method, and controlling, based on identifying that the movement direction of the remote control device is a second direction from the second area into the margin area, the moving state of the pointing object according to the absolute coordinate method, wherein the margin area is different from the first area and the second area, wherein the first area covers a first space that includes the screen, wherein the second area covers a second space outside of the screen, and wherein the margin area covers a third space between the first space and the second space.

10. The control method of claim 9, wherein, when vector signals corresponding to a magnitude and a direction of the remote control device are received from the remote control device, the control method further comprises calculating a moving trajectory of the remote control device by summing the received vector signals and determining whether the remote control device belongs to the first area or the second area based on the calculated moving trajectory.

11. The control method of claim 9, further comprising displaying the pointing object on a standard position and generating a virtual absolute coordinate system based on the standard position in which the pointing object is displayed, when a trigger signal for establishing the standard position on the screen is received from the remote control device.

12. The control method of claim 11, wherein the controlling the moving state of the pointing object comprises moving the pointing object to a position corresponding to a magnitude and a direction of the movement regarding the first area, and moving the pointing object to a position corresponding to a direction as directed by the remote control device on the virtual absolute coordinate system regarding the second area.

13. The control method of claim 11, wherein the controlling the moving state of the pointing object comprises:
controlling the moving state by accelerating and decelerating a moving speed of the pointing object based on the received signal, when the remote control device is positioned within the first area, and
moving the pointing object to the coordinate value corresponding to a direction as directed by the remote control device on the virtual absolute coordinate system without accelerating and decelerating the moving speed of the pointing object, when the remote control device is positioned within the second area.

14. The control method of claim 11, wherein the controlling the moving state of the pointing object comprises:
moving the pointing object on one border area of the screen according to a direction in which the remote control device moves, when the remote control device is determined to have entered into the second area while the moving state of the pointing object is controlled according to the relative coordinate method on the first area.

15. The control method of claim 14, wherein the controlling the moving state of the pointing object comprises: fixing at least one of a x and a y coordinate value of the pointing object according to the absolute coordinate method, when the remote control device moves within the second area.

16. The control method of claim 11, wherein the controlling the moving state of the pointing object comprises:
performing the absolute coordinate method to display the pointing object such that an x or a y coordinate value of the pointing object corresponding to a direction of the movement from the second area into the margin area is fixed, when the remote control device is determined to have entered from the second area towards the margin area, and
moving and displaying the position of the pointing object according to the relative coordinate method when the remote control device is determined to have entered from the margin area into the first area of the display.

17. The method of claim 9, wherein the first area extends in the first direction from a first location at a first side of the screen to a second location at a second side of the screen opposite to the first edge,
wherein the margin area extends in the first direction from the second location to a third location different from the second location, and
wherein the second area extends outward in the first direction from the third location.

18. A display apparatus, comprising:
a display;
a communicator; and
a processor configured to:
control the display to display a pointing object;
based on receiving a signal corresponding to a movement of a remote control device from the remote control device, control a moving state of the pointing object according to the received signal,
control, for a first area comprising a screen of the display, the moving state of the pointing object according to a relative coordinate method,
control, for a margin area outside the screen of the display, the moving state of the pointing object according to a coordinate method, among the relative coordinate method and the absolute coordinate method, selected based on a movement direction of the remote control device,
control, for a second area outside the margin area, the moving state of the pointing object according to the absolute coordinate method,
based on identifying that the movement direction of the remote control device is a first direction from the first area into the margin area, control the moving state of the pointing object according to the relative coordinate method, and
based on identifying that the movement direction of the remote control device is a second direction from the second area into the margin area, control the moving state of the pointing object according to the absolute coordinate method,
wherein the margin area is different from the first area and the second area,
wherein the first area extends in the first direction from a first location at a first side of the screen to a second location at a second side of the screen opposite to the first edge,
wherein the margin area extends in the first direction from the second location to a third location different from the second location, and
wherein the second area extends outward in the first direction from the third location.

* * * * *